United States Patent
Crompton et al.

(10) Patent No.: US 9,822,912 B2
(45) Date of Patent: Nov. 21, 2017

(54) PUSH-TO-CONNECT FITTING DEVICE, ARRANGEMENT AND METHOD

(71) Applicant: Quick Fitting, Inc., Warwick, RI (US)

(72) Inventors: David B. Crompton, Tiverton, RI (US); Libardo Ochoa Dias, West Warwick, RI (US); Herbert J. Bouchard, West Greenwich, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 15/072,439

(22) Filed: Mar. 17, 2016

(65) Prior Publication Data
US 2017/0268708 A1    Sep. 21, 2017

(51) Int. Cl.
*F16L 37/091* (2006.01)
*F16L 37/02* (2006.01)
*F16L 21/00* (2006.01)
*H02G 3/38* (2006.01)

(52) U.S. Cl.
CPC ............. *F16L 37/02* (2013.01); *F16L 21/007* (2013.01); *H02G 3/28* (2013.01)

(58) Field of Classification Search
CPC ................................... F16L 37/091
USPC ................. 285/339, 342–343, 340
See application file for complete search history.

(56) References Cited

U.S. PATENT DOCUMENTS

| | | | | |
|---|---|---|---|---|
| 2,316,806 A * | 4/1943 | Parker | ............... | F16L 19/12 285/342 |
| 2,398,618 A * | 4/1946 | Chavayda | ............... | F16L 19/12 285/116 |
| 2,478,149 A * | 8/1949 | Wolfram | ............... | F16L 19/08 285/342 |
| 3,074,747 A * | 1/1963 | Boughton | ............... | F16L 19/086 285/342 |
| 3,188,122 A * | 6/1965 | Smith | ............... | F16L 19/075 285/249 |
| 3,193,299 A * | 7/1965 | Gardner | ............... | F16L 13/122 277/619 |
| 3,498,647 A * | 3/1970 | Schroder | ............... | F16L 19/086 174/75 C |
| 3,986,730 A * | 10/1976 | Martelli | ............... | F16L 19/075 285/110 |
| 4,037,864 A * | 7/1977 | Anderson | ............... | F16L 47/04 285/342 |
| 5,988,690 A * | 11/1999 | Bogard | ............... | F16L 19/08 285/340 |
| 7,862,089 B2 | 1/2011 | Crompton | | |
| 7,942,161 B2 | 5/2011 | Crompton | | |

(Continued)

OTHER PUBLICATIONS

International Search Report and Written Opinion, PCT/US17/22631, U.S. International Searching Authority, Jun. 7, 2017.

*Primary Examiner* — David E Bochna
(74) *Attorney, Agent, or Firm* — Williams Mullen, PC; Thomas F. Bergert

(57) ABSTRACT

Embodiments of an integrated piping conduit include a device having a center body with an interior surface having a tube stop extending radially inwardly thereof, one or more head connectors, and a packing arrangement comprising at least one sealing ring, a spacer gland and a grip ring maintained within a radial housing compartment of the one or more head connectors. The packing arrangement can further include a retainer ring. In various embodiments, each head connector is secured to the center body through gluing or ultrasonic welding.

16 Claims, 7 Drawing Sheets

(56) References Cited

U.S. PATENT DOCUMENTS

| | | |
|---|---|---|
| 8,205,915 B1 | 6/2012 | Crompton |
| 8,210,576 B2 | 7/2012 | Crompton |
| 8,398,122 B2 | 3/2013 | Crompton |
| 8,480,134 B2 | 7/2013 | Crompton |
| 8,844,974 B1 | 9/2014 | Crompton |
| 8,844,981 B1 | 9/2014 | Crompton |
| 9,068,680 B1 | 6/2015 | Crompton |
| 9,217,529 B2 | 12/2015 | Crompton |
| 2002/0163195 A1* | 11/2002 | Vitel ................ F16L 21/08 285/379 |
| 2009/0273130 A1 | 11/2009 | LaValle et al. |
| 2015/0155654 A1 | 6/2015 | Ferry |
| 2015/0345663 A1 | 12/2015 | Crompton et al. |

\* cited by examiner

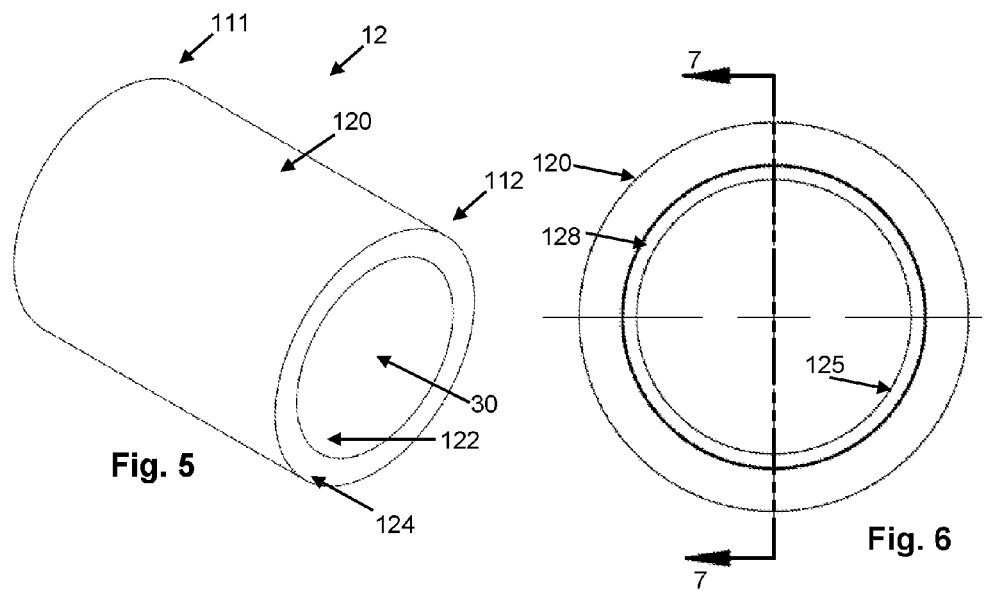
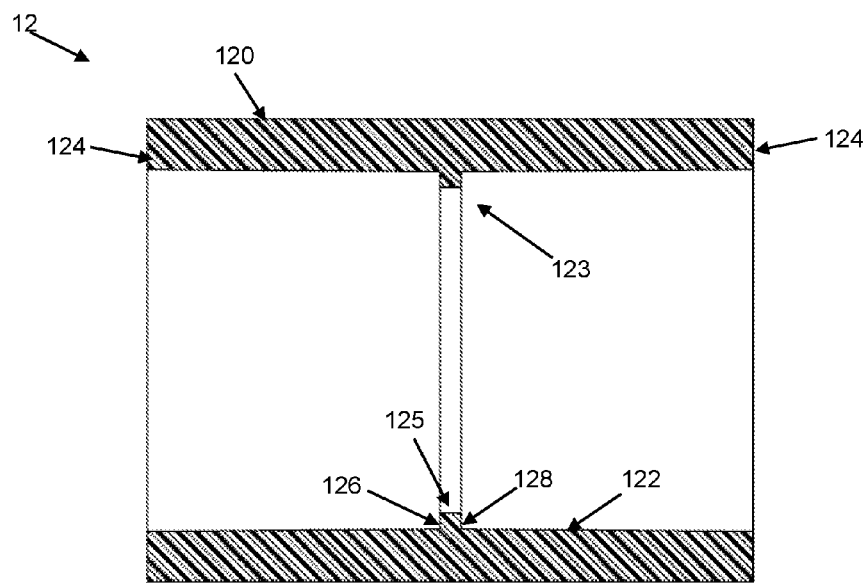

PUSH-TO-CONNECT FITTING DEVICE, ARRANGEMENT AND METHOD

FIELD OF THE INVENTION

The present invention relates to piping conduits, and more particularly to a push-to-connect fitting device, arrangement and method that facilitates protection of contents.

BACKGROUND

Piping systems exist to facilitate the flow of fluids (e.g., liquid, gas (such as air) or plasma), contain contents internally and provide other functions. For example, piping systems can include conduits that maintain electrical wiring, effectively bundling and containing wiring within a confined and protected area, so that the inserted wires can be collectively transported, shielded and joined from one point to another. In many instances, one of the end points for the conduit is an electrical box.

Conduits or piping connections for managing loose wires are generally tube-shaped elements with a hollow interior for permitting wiring to pass through. Such conduits are useful in properly protecting the wires and cables contained therein. If unprotected, the loose wires and/or cables can be damaged, cut (such as against a metal edge of the electrical box opening) and can potentially cause a short circuit, shock, or fire. While code regulations exist to help prevent these problems, various installations may not meet code requirements. When traditional conduits are positioned within an electrical box opening, they may be unsecured, or possibly secured through a basic form of attachment such as a threaded engagement. Electrical conduits can be made of metal, fiber, plastic and other materials. Non-metal conduit materials, such as PVC, are typically less expensive and lighter in weight.

In recent years, push-fit technology has been employed with piping systems, and particularly with plumbing systems, to reduce the dangers and time involved in soldering joints and other connection methods. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology. The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal. Accordingly, no wrenches, clamping, gluing or soldering is involved. Push-fit and/or quick-connect technology for piping systems can be obtained, for example, through Quick Fitting, Inc. of Warwick, R.I., USA, suppliers of the CoPro®, ProBite®@, LocJaw™, Blue-Hawk™, CopperHead® and Push Connect® lines of push fittings and related products. Also, such technology is described, for example, in U.S. Pat. No. 7,862,089, U.S. Pat. No. 7,942,161, U.S. Pat. No. 8,205,915, U.S. Pat. No. 8,210,576, U.S. Pat. No. 8,398,122. U.S. Pat. No. 8,480,134, U.S. Pat. No. 8,844,974, U.S. Pat. No. 8,844,981, U.S. Pat. No. 9,068,680, and U.S. Pat. No. 9,217,529, the disclosures of which are incorporated herein by reference in their entireties.

SUMMARY

The present invention provides, in part, a push-to-connect fitting device, arrangement and method that facilitates the re-use of push fittings without damage to the fitting elements or the pipe, while also facilitating management of multiple wires, cables and/or connections in electrical environments in a manner that meets requirements and saves time for professionals. The present invention can connect piping elements using glue and/or ultrasonic welding in order to maintain one or more head connectors with a center body, thereby permitting one or more tubes to be inserted and maintained with the center body and head connector(s).

In various embodiments, the present invention permits underside loading, as opposed to topside loading associated with traditional push-to-connect plumbing technology. In addition to electrical environments, embodiments of the present invention can also be employed with irrigation and other fluid flow environments.

In various embodiments, a device according to the present invention includes a center body having an interior surface with a tube stop extending radially inwardly thereof, and one or more head connectors, each of which has a packing arrangement comprising at least one sealing ring, a spacer gland and a grip ring. The packing arrangement can further include a retainer ring. The retainer ring is positioned on the axially outward side of the head connector, and is capable of axial insertion into the cavity of the head connector in order to lift teeth of the grip ring radially outwardly to permit insertion and removal of tubes to be connected via the center body. In various embodiments, each head connector is secured to the center body through gluing or ultrasonic welding. Among other things, it will be appreciated that the present invention assists production efforts by eliminating the time required for creating multiple molds associated with other push-to-connect technologies.

In various embodiments, the present invention employs a lockable release pusher that, when in the unlocked position, permits the pusher to move axially inwardly of the fitting, lifting teeth of a fastening ring and thereby facilitating the insertion and release of a cylindrical object such as a piping element held within the fitting. When a piping element is desired to be removed, axially applied pressure can be provided again to the release pusher, lifting the fastening ring teeth off of the inserted pipe to allow it to be removed. In one embodiment of the present invention, the release pusher is permanently secured to the fitting and is part of the packing arrangement.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. In one embodiment of the present invention, one or more sealing member gasket inserts (e.g., O-ring members) fit within a sealing compartment defined in the interior of the fitting. The spacer gland can be provided to provide support for the one or more sealing rings. The interior compartments and housing elements provide integrated support for the sealing members and fastening ring when opposing force is applied to piping elements that have been inserted into the coupling arrangement.

Other methods, devices and arrangements as described herein are provided by the present invention.

BRIEF DESCRIPTION OF THE DRAWINGS

FIG. 5 is a perspective view of a center body element in accordance with embodiments of the present invention.

FIG. 6 is a right side view of the center body element of FIG. 5.

FIG. 7 is a cross-sectional view of the center body element as taken along line 7-7 of FIG. 6.

DETAILED DESCRIPTION OF THE PREFERRED EMBODIMENTS

Figure 1:
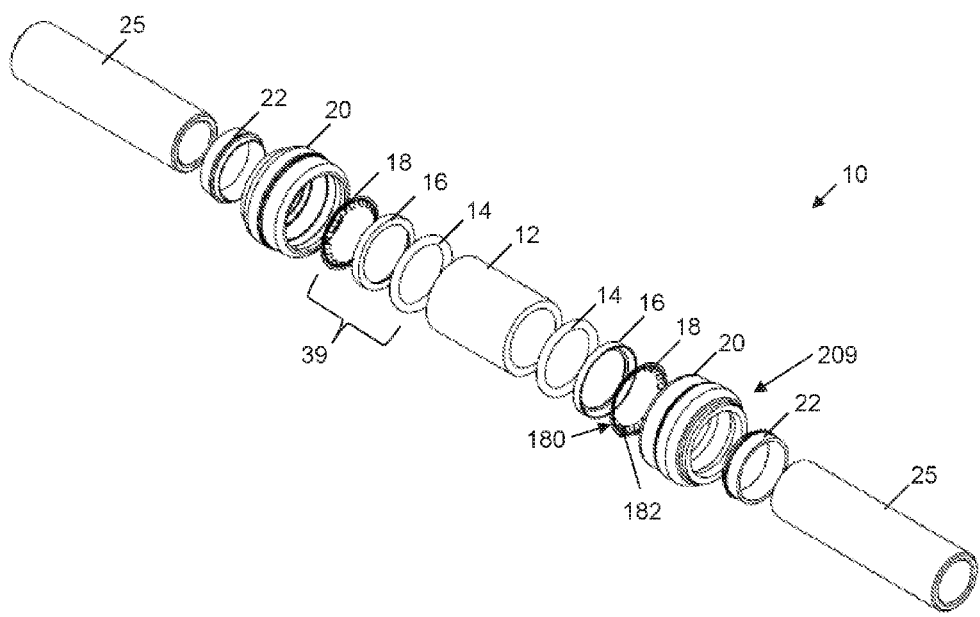
FIG. 1 is an exploded front perspective view of a device in accordance with embodiments of the present invention.
Figure 2:
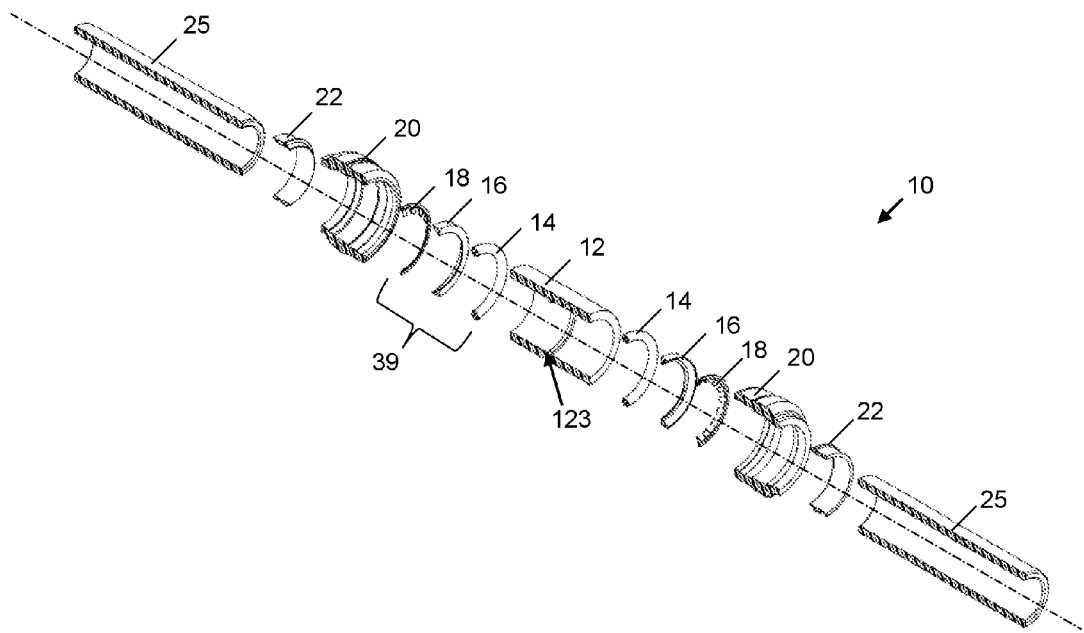
FIG. 2 is a perspective view showing the elements of the device of FIG. 1 in cross-section.
Figure 3:
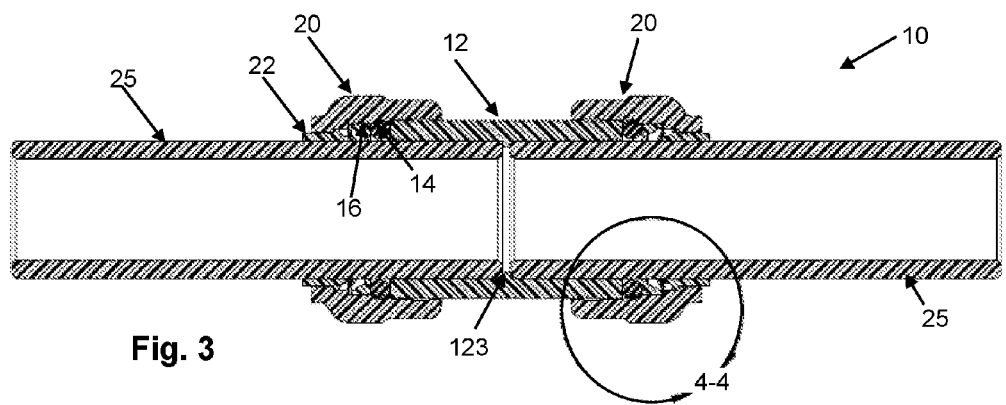
FIG. 3 is a front cross-sectional view of one embodiment of the device of the present invention.

In the device 10 of embodiments of the present invention as shown in FIGS. 1 through 16, elements of the device as shown include: a fitting or conduit center body member 12, at least one sealing ring 14, at least one spacer gland 16, at least one grip ring 18, at least one head connector 20 and at least one release pusher or retainer ring 22. FIGS. 1 through 3 also show two tubes 25 connected using the device 10. In various embodiments, the center body member 12 can be forged CW617N brass, with full porting and full flow fitting, for example. In other embodiments, the body member 12 can be a plastic material.

In various embodiments, the center body member 12 is a substantially cylindrical body having an exterior surface 120, and an interior surface 122 having a tube stop 123 extending radially inwardly thereof. The tube stop 123 includes first 126 and second 128 radially extending edges, and an axially extending surface 125. The edges 126, 128 act to stop the axial insertion of tubes during operation of the present invention, and surface 125 is generally axially aligned with the internal surfaces of inserted tubes to facilitate smooth movement of any materials or fluids inside of the tubes, including electrical wiring, for example. The interior surface 122 forms a cavity 30 extending axially through the center body member 12, as shown in FIG. 5. The center body member 12 also includes axially outer walls 124, as shown in FIGS. 5 through 7, and the walls 124 can vary in thickness depending upon the particular application involved.

As shown in FIGS. 1 through 4 and 8 through 11, one or more head connectors 20 can be provided, each of which can include an interior packing arrangement 39 comprising at least one sealing ring (which can be optionally lubricated) 14, a spacer gland 16 and a grip or fastening ring 18. In various embodiments, the packing arrangement 39 also includes a retainer ring 22.

Sealing member 14 can be substantially ring-shaped, and can be formed of a rubber-based material or similar rigid yet deformable material designed to slightly compress when pressure is applied.

Each head connector 20 is a substantially ring-shaped body with a tube receiving opening 200 therein, and each of the sealing ring 14, spacer gland 16, grip ring 18 and retainer ring 22 has a substantially ring-shaped body forming an opening extending through the body along an axis which is aligned with axis 222 of head connector when installed. Each of sealing ring 14, spacer gland 16, grip ring 18 and retainer ring 22 has an internal diameter that allows for smooth and snug engagement of a piping or tubing element external surface 225. In various embodiments, the diameter of the fastening ring 18 to the radially interior edge of the fastening ring teeth 182 is less than the diameter of the spacer gland 16, sealing ring 14 and retainer ring 22, as the fastening ring teeth 182 engage the outer surface 225 of an inserted tube 25 during operation. The diameter of the fastening ring to the teeth 182 is manipulable during operation so as to permit insertion, removal and retention of tube elements 25 as described herein. The packing arrangements 39 are not housed within the center body member 12, but rather within each head connector 20.

Figure 4:
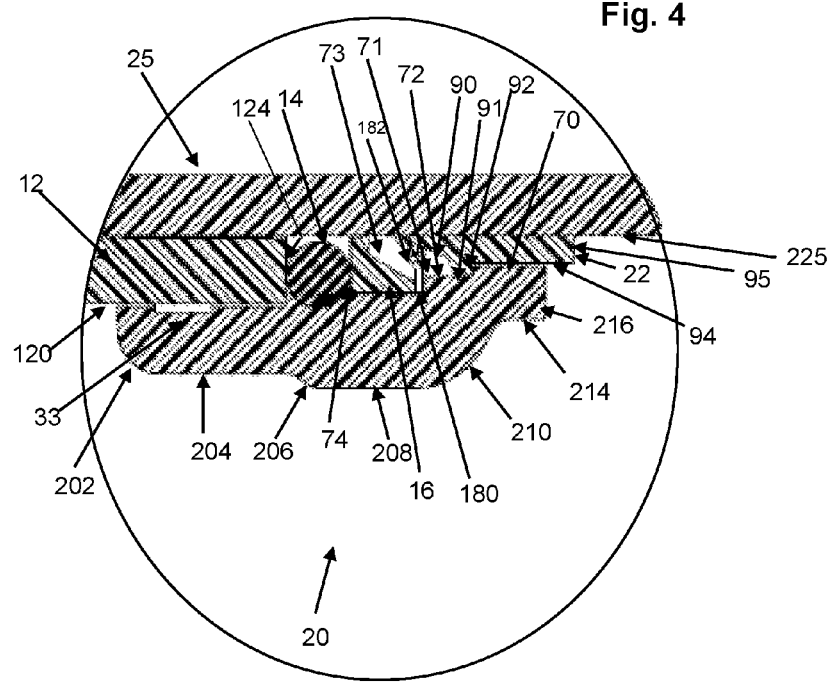
FIG. 4 is an enlarged view of the portion of the device taken from encircled portion 4-4 of FIG. 3.
Figure 8:
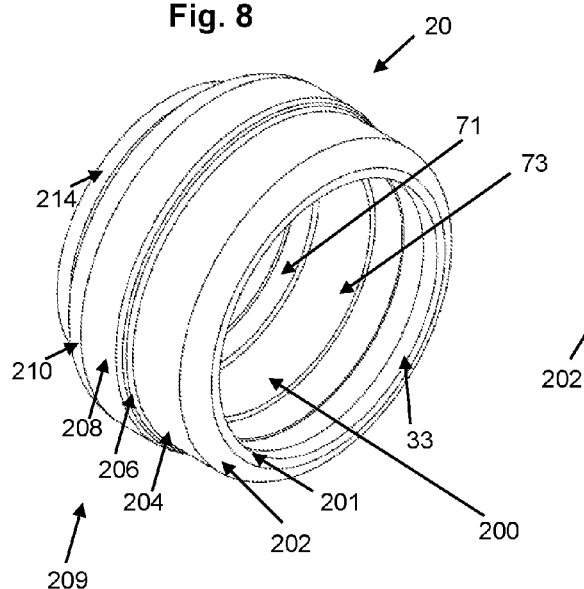
FIG. 8 is a rear right perspective view of a head connector in accordance with embodiments of the present invention.
Figure 9:
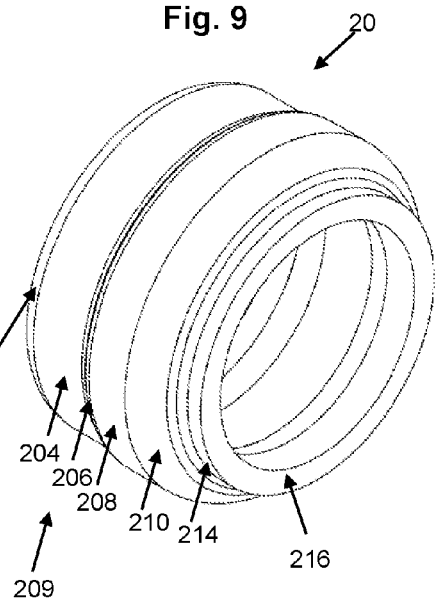
FIG. 9 is a front right perspective view of a head connector in accordance with embodiments of the present invention.
Figure 10:
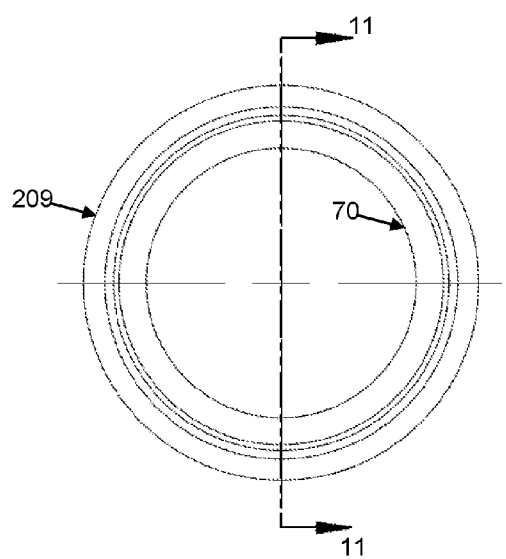
FIG. 10 is a right side view of the head connector of FIG. 9.
Figure 11:
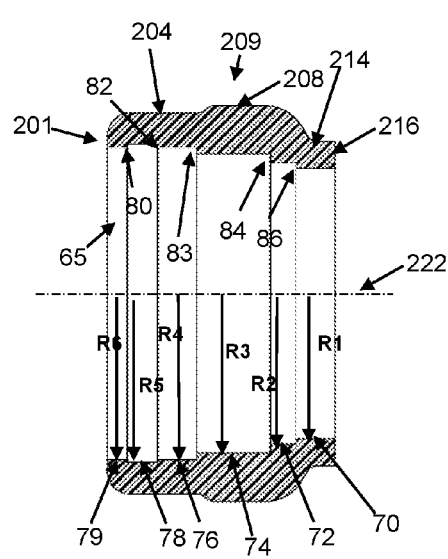
FIG. 11 is a cross-sectional view of the head connector as taken along line 11-11 of FIG. 10.
Figure 12:
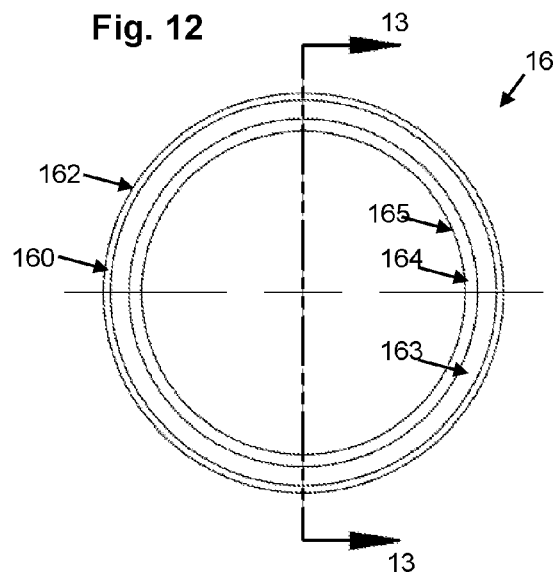
FIG. 12 is a right side view of a spacer gland in accordance with embodiments of the present invention.
Figure 13:
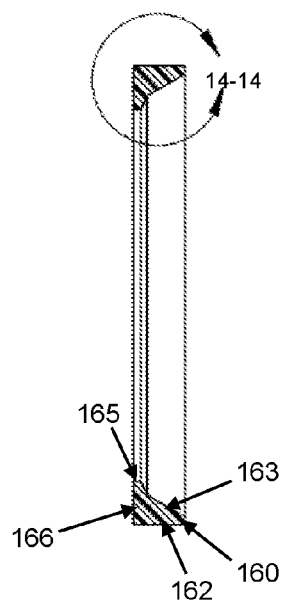
FIG. 13 is a cross-sectional view of the spacer gland as taken along line 13-13 of FIG. 12.
Figure 14:
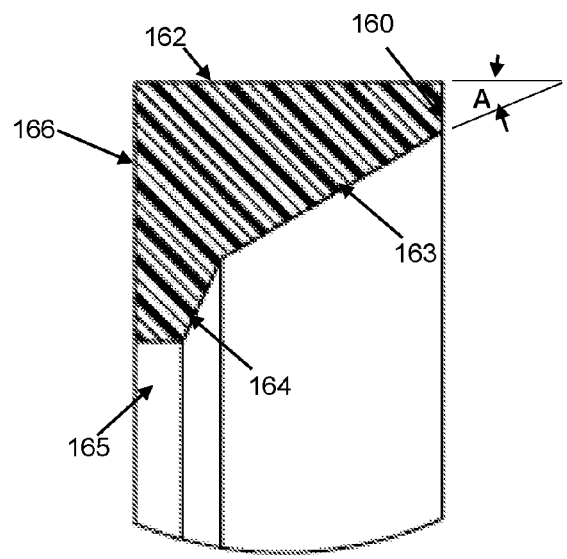
FIG. 14 is an enlarged view of the portion of the spacer gland taken from encircled portion 14-14 of FIG. 13.
Figure 15:
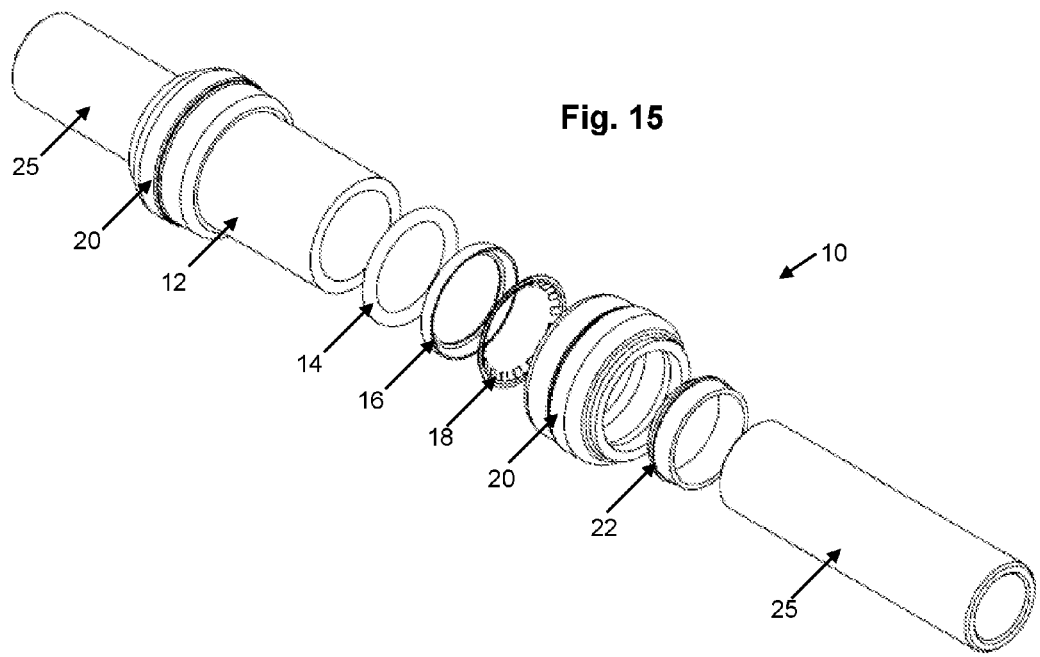
FIG. 15 is an exploded front perspective view of a device with an installed head connector and packing arrangement on one side of the center body in accordance with embodiments of the present invention.
Figure 16:
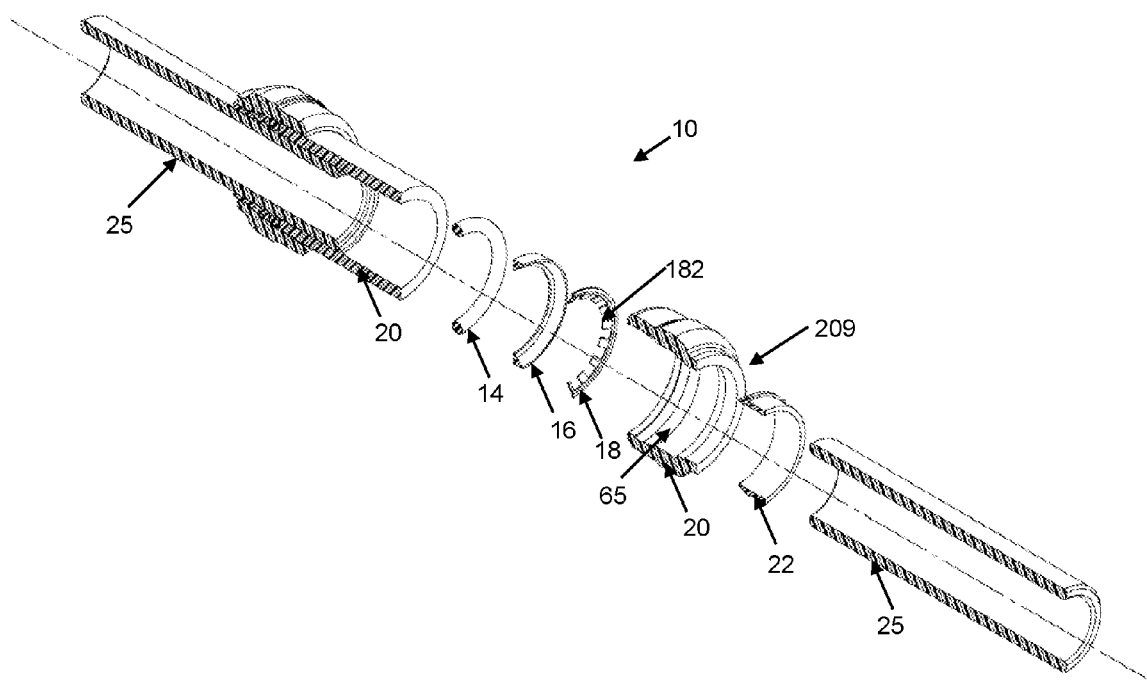
FIG. 16 is a perspective view showing the elements of the device of FIG. 15 in cross-section.

As shown in FIG. 11, each head connector 20 is formed with an interior surface 65 having various axially extending wall surface segments 70, 72, 74, 76, 78 and 79, each of which has a respective radial distance from the central axis 222 of the head connector 20. For instance, segment 70 has a radial distance R1, segment 72 has a radial distance R2, segment 74 has a radial distance R3, segment 76 has a radial distance R4, segment 78 has a radial distance R5, and segment 79 has a radial distance R6. It will be appreciated that only segments 76 and 79 have the same radial distance from central axis 222, wherein radial distance R4 is substantially equal to radial distance R6. These segments 76 and 79 assist in forming a first radial housing compartment 33. As shown in FIG. 4, the outer wall 120 of center body connector 12 and the wall surface segment 78 also assist in forming the first radial housing compartment 33, which extends from axially inner edge 80 of wall surface segment 79 to axially outer edge 82 of wall surface segment 76. The interior surface 65 of the head connector 20 defines a cavity 200 extending axially through the head connector 20 along axis 222.

As shown in FIG. 11, radial distance R5 is greater than the remaining radial distances. Radial distances R4 and R6 are greater than distances R1, R2 and R3. Radial distance R3 is greater than distances R2 and R1, and radial distance R2 is greater than distance R1. The substantially equidistant nature of distances R4 and R6 assists in smooth and snug engagement of the outer wall 120 of center body connector 12 during operation. Further, the radial distance R3 to the second compartment 73 housing the sealing ring 14, spacer gland 16 and fastening ring 18 is greater than the radial distance R2 to the compartment 71 housing the retainer ring 22, which is inapposite to the relationship of such compartments in other push-to-connect technologies employing a central fitting component. As the present invention employs a central body member 12 having no internal packing arrangement, and further employs a pair of head connectors 20 as shown in FIGS. 1, 2 and 15-16, the arrangement of radial distances, including distances R2 and R3, assists in providing a quickly assembled and strong conduit device requiring no coining or split members, for example.

As can be seen in FIGS. 4 and 8 through 11, wall surface segment 74 forms a second radial housing compartment 73 between axially outer edge 83 of segment 74 and axially outer edge 84 of segment 72. The axially outer wall 124 of center body member 12 and outer surface 225 of tube 25 also provide surface boundaries for the second radial housing compartment 73. Additionally, wall surface segment 72 forms a third radial housing compartment 71 between axially outer edge 84 of segment 72 and axially outer edge 86 of segment 70. Third compartment 71 houses the radially outer ledge segment 91 and back wall 92 of the release pusher 22, as shown in FIG. 4.

As further shown in FIGS. 4 and 8 through 11, head connector 20 is provided with an outer surface 209, an axially outer wall segment 216 and an axially inner wall segment 201. Segment 201 can be formed with a rounded edge 202 shared by first circumferential segment 204, which extends radially outwardly along intermediate segment 206 to a second circumferential segment 208. Second circumferential segment 208 is provided with a rounded edge 210 shared by third circumferential segment 214. Circumferential segments 204, 208 and 214 are substantially axially aligned with the center axis 222 of the head connector 20, wherein segment 208 has a diameter that is greater than the respective diameters of segments 204 and 214, and wherein segment 204 has a diameter that is greater than diameter 214.

As shown in FIGS. 1 through 4 and 12 through 14, the spacer gland 16 has a circumferential base 162, a sealing member-engaging surface 166 and fastening ring-engaging surfaces 160 and 163. In various embodiments, spacer gland 16 can comprise an injection-molded plastic or a metal material such as brass, for example. Surface 160 engages the base 180 of the fastening ring 18 and pinches the fastening ring base 180 against the axially outer edge 84 of segment 72 of the head connector 20, whereas surface 163 is engages the teeth 182 of the fastening ring 18 during operation. Further, fastening ring teeth engaging surface 163 can extend from surface 160 at an angle A of between approximately 6.5 degrees and approximately 50 degrees from the circumferential base 162. In a particular embodiment of the present invention, angle A is approximately 37 degrees. In one embodiment of the present invention, the spacer gland 16 is split, including a first circumferential end point and a second circumferential end point that do not connect and thereby form a slit, which allows the gland to be manually pinched and compressed to facilitate installation into the second radial housing compartment 73.

As further shown in FIGS. 1 and 4, the fastening ring 18 includes a substantially cylindrical base 180 that has a plurality of bifurcated or square edged teeth 182 extending radially inwardly from and along the base 180 of the ring 18. The number of teeth can readily vary in number and size.

The fastening ring 18 can comprise a spring steel formulation, for example, that enables the fastening ring to be malformed during installation, while springing back into its originally manufactured position once installed. The fastening ring can be split, in various embodiments of the present invention. Such split arrangements for the spacer gland and fastening ring are shown and described, for example, in U.S. Pat. No. 9,068,860, the disclosure of which is hereby incorporated by reference.

As shown in FIGS. 1 through 4 and 15 through 16, the retainer ring 22 is positioned on the axially outward side 209 of the head connector, and is capable of axial insertion into the cavity 30 of the head connector 20 in order to lift the teeth 182 of the grip ring 180 axially inwardly and radially outwardly to permit insertion and removal of tubes 25 to be connected via the center body. In various embodiments, each head connector 20 is secured to the center body through applying glue in compartment 33 or by ultrasonic welding, for example. Among other things, it will be appreciated that the present invention assists production efforts by eliminating the time required for multiple molds associated with other push-to-connect technologies.

In various embodiments, the release pusher 22 is substantially cylindrical and hollow and includes an external tip 90 at the fastening ring engaging end thereof, as shown in FIG. 4. The release pusher 22 also includes a radially outer ledge segment 91, a ledge back wall 92, and a second outer wall segment 94. The pusher 22 can comprise an injection-molded plastic or a metal material such as brass, for example. When pressure is applied on the back side 95 of the release pusher 22, the external tip 90 can engage the inside surface of the fastening ring teeth 182 and the ledge back wall 92 can removably engage the axially outer edge 86 of segment 70 of the head connector 20, as shown in FIG. 4. Once the release pusher 22 is inserted into the conduit formed by the head connector 20 and packing arrangement 39, the radially outer ledge segment 91 provides for flush engagement with the wall segment 72 of the head connector 20.

In various embodiments, the sealing ring 14, spacer gland 16 and fastening ring 18 can be housed within the head connector 20 so as to substantially abut one another within the second radial housing element 73. Further, the fastening ring base 180 is securely retained between the surface 160 of spacer gland 16 and the axially outer edge 84 of segment 72 of the head connector 20. In this way, the fastening ring 18 does not move axially within the center body 12 during operation.

In operation, when two tubes 25 are to be joined, a pair of head connectors 20 is provided, and a respective packing arrangement 39 is installed therein. For example, a grip ring 18 is inserted into the second radial housing compartment 73 of each head connector 20, followed by a spacer gland 16 and a sealing ring 14. A retaining ring 22 is also inserted into the third radial housing compartment 71 of each head connector 20. Next, the center body member 12 is provided and glue can optionally be inserted into the first radial housing compartment 33 of the head connector. A head connector 20 with installed packing arrangement is then inserted on each end 111, 112 of the center body member 12, and secured to the head connectors 20 via glue as it is dried, or by ultrasonic welding processes if glue is not employed. The securing of the head connectors 20 to the center body member 12 assists in retaining the sealing member 14, spacer gland 16 and fastening ring 18 securely within compartment 73. A tube 25 with a release pusher tool positioned around the circumference of the tube 25 can then be inserted into the cavity 200 at one end of the head connector 20, and the tool (or alternatively, manual or similar pressure) can be applied to the end 95 of the retaining ring 22, thereby forcing the fastening ring teeth radially outwardly such that the tube 25 can be smoothly inserted until it reaches the tube stop 123 of the center body member 12. At such time, the force on the retaining ring 22 can be released, thereby allowing the retaining ring back ledge 92 to rest within the third compartment 71, and allowing the fastening ring teeth 182 to engage the outer surface 225 of the tube 25. A similar installation of another tube 25 can take place at the other end of the head connector 20.

It will be appreciated that any and all dimensions described herein are exemplary and provided as embodiments associated with proper working operation of the present invention. Further, it will be appreciated that, in various embodiments of the present invention, the members of the push connect joint assembly can be formed through hydroforming processes.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A conduit device, comprising:
    first and second head connectors, each of said head connectors having a body with an interior surface defining a cavity extending axially through the first head connector, wherein the interior surface includes a plurality of axially extending wall segments forming a plurality of radial housing compartments in the interior surface, including a first radial housing compartment having a first radial distance to a first wall segment, a second radial housing compartment having a second radial distance to a second wall segment, and a third radial housing compartment having a third radial distance to a third wall segment, wherein the first radial distance is greater than the second and third radial distances, and the second radial distance is greater than the third radial distance;
    a first packing arrangement maintained within at least the second radial housing compartment of the first head connector, wherein the first packing arrangement includes at least one ring-shaped sealing member, at least one spacer gland and at least one fastening ring, wherein the fastening ring is maintained between the at least one spacer gland and an axially outer edge of one of the plurality of axially extending wall segments;
    a second packing arrangement maintained within at least the second radial housing compartment of the second head connector; and
    a substantially cylindrical center body element having first and second ends, wherein the first end is secured to the interior surface of the first head connector proximate the first radial housing compartment of the first head connector, and wherein the second end is secured to the interior surface of the second head connector proximate the first radial housing compartment of the second head connector.

2. The conduit device of claim 1, wherein the first packing arrangement includes a retainer ring retained within the third radial housing compartment.

3. The conduit device of claim 1, wherein the center body element is secured to the first head connector using glue.

4. The conduit device of claim 1, wherein the center body element is secured to the first head connector using ultrasonic welding.

5. A conduit device, comprising:
    first and second head connectors, each of said head connectors having a body with an interior surface defining a cavity extending axially through the first head connector, wherein the interior surface includes a plurality of axially extending wall segments forming a plurality of radial housing compartments in the interior surface, including a first radial housing compartment having a first radial distance to a first wall segment, a second radial housing compartment having
    a second radial distance to a second wall segment, and a third radial housing compartment having a third radial distance to a third wall segment, wherein the first radial distance is greater than the second and third radial distances, and the second radial distance is greater than the third radial distance;
    a first packing arrangement maintained within at least the second radial housing compartment of the first head connector;
    a second packing arrangement maintained within at least the second radial housing compartment of the second head connector;
    a substantially cylindrical center body element having first and second ends, wherein the first end is secured to the interior surface of the first head connector proximate the first radial housing compartment of the first head connector, and wherein the second end is secured to the interior surface of the second head connector proximate the first radial housing compartment of the second head connector; and
    wherein the first radial housing compartment comprises first, second and third sequential wall segments, and wherein the center body element engages the first and third wall segments of the first radial housing compartment, but does not engage the second wall segment of the first radial housing compartment.

6. A method for joining two tubes, comprising the steps of:
    providing first and second head connectors, each of said head connectors having a body with an interior surface defining a cavity extending axially through the first head connector, wherein the interior surface includes a plurality of axially extending wall segments forming a plurality of radial housing compartments in the interior surface, including a first radial housing compartment having a first radial distance to a first wall segment, a second radial housing compartment having a second radial distance to a second wall segment, and a third radial housing compartment having a third radial distance to a third wall segment, wherein the first radial distance is greater than the second and third radial distances, and the second radial distance is greater than the third radial distance;
    inserting a first packing arrangement within at least the second radial housing compartment of the first head connector, wherein the first packing arrangement includes inserting at least one ring-shaped sealing member, at least one spacer gland and at least one fastening ring within at least the second radial housing compartment, and wherein the fastening ring is maintained between the at least one spacer gland and an axially outer edge of one of the plurality of axially extending wall segments;
inserting a second packing arrangement within at least the second radial housing compartment of the second head connector;
providing a substantially cylindrical center body element having first and second ends;
securing the first end of the body element to the interior surface of the first head connector proximate the first radial housing compartment of the first head connector; and
securing the second end of the body element to the interior surface of the second head connector proximate the first radial housing compartment of the second head connector.

7. The method of claim 6, wherein the step of securing the first and second ends of the body element to the first and second head connectors, respectively, includes the step of inserting glue into the first radial housing compartment of the first and second head connectors.

8. The method of claim 7, wherein the first radial housing compartment comprises first, second and third sequential wall segments, and wherein glue is inserted into the second wall segment, and further wherein the center body element engages the first and third wall segments of the first radial housing compartment, but does not engage the second wall segment of the first radial housing compartment.

9. The method of claim 6, wherein inserting the first packing arrangement includes inserting a retainer ring retained within the third radial housing compartment.

10. The method of claim 6, wherein the step of securing the first and second ends of the body element to the first and second head connectors, respectively, is performed by ultrasonic welding.

11. A conduit device, comprising:
a head connector body with an interior surface defining a cavity extending axially therethrough, wherein the interior surface includes a plurality of axially extending wall segments forming a plurality of radial housing compartments in the interior surface, including:
a first radial housing compartment having a first radial distance to a first wall segment;
a second radial housing compartment having a second radial distance to a second wall segment; and
a third radial housing compartment having a third radial distance to a third wall segment, wherein the first radial distance is greater than the second and third radial distances, and the second radial distance is greater than the third radial distance; and
a first packing arrangement maintained within at least the second radial housing compartment, wherein the first packing arrangement comprises at least one ring-shaped sealing member, at least one spacer gland and at least one fastening ring, wherein the fastening ring is maintained between the at least one spacer gland and an axially outer edge of one of the plurality of axially extending wall segments.

12. The conduit device of claim 11, wherein the first radial housing compartment further has a fourth radial distance to fourth and fifth wall segments, wherein the radial distance to the fourth and fifth wall segments is less than the radial distance to the first wall segment.

13. The conduit device of claim 11, further including a wall segment having a radial distance that is less than the first, second and third radial distances.

14. The conduit device of claim 11, wherein the first packing arrangement includes a retainer ring retained within the third radial housing compartment.

15. The conduit device of claim 11, further including a body element having a first end secured to the interior surface of the head connector body proximate the first radial housing compartment.

16. A method for joining two tubes, comprising the steps of:
providing first and second head connectors, each of said head connectors having a body with an interior surface defining a cavity extending axially through the first head connector, wherein the interior surface includes a plurality of axially extending wall segments forming a plurality of radial housing compartments in the interior surface, including a first radial housing compartment having a first radial distance to a first wall segment, a second radial housing compartment having a second radial distance to a second wall segment, and a third radial housing compartment having a third radial distance to a third wall segment, wherein the first radial distance is greater than the second and third radial distances, and the second radial distance is greater than the third radial distance;
inserting a first packing arrangement within at least the second radial housing compartment of the first head connector;
inserting a second packing arrangement within at least the second radial housing compartment of the second head connector;
providing a substantially cylindrical center body element having first and second ends;
securing the first end of the body element to the interior surface of the first head connector proximate the first radial housing compartment of the first head connector;
securing the second end of the body element to the interior surface of the second head connector proximate the first radial housing compartment of the second head connector; and
wherein the first radial housing compartment comprises first, second and third sequential wall segments, and wherein the center body element engages the first and third wall segments of the first radial housing compartment, but does not engage the second wall segment of the first radial housing compartment.

\* \* \* \* \*